United States Patent [19]

Naito

[11] Patent Number: 5,378,967
[45] Date of Patent: Jan. 3, 1995

[54] BRUSHLESS MOTOR DRIVE CIRCUIT

[75] Inventor: Hayato Naito, Komagane, Japan

[73] Assignee: Sankyo Seiki Mfg. Co., Ltd., Nagano, Japan

[21] Appl. No.: 54,865

[22] Filed: Apr. 29, 1993

Related U.S. Application Data

[63] Continuation of Ser. No. 771,125, Oct. 3, 1991, abandoned.

[30] Foreign Application Priority Data

Oct. 15, 1990 [JP] Japan .................. 2-275907

[51] Int. Cl.$^6$ .................................. H02P 6/02
[52] U.S. Cl. ........................... 318/254; 318/138; 318/431; 318/471
[58] Field of Search ............... 318/138, 254, 430, 431, 318/432, 433, 439, 471; 388/934

[56] References Cited

U.S. PATENT DOCUMENTS

| | | | |
|---|---|---|---|
| 4,051,420 | 9/1977 | Tanikoshi | 318/254 |
| 4,070,606 | 1/1978 | Morozumi et al. | 318/254 |
| 4,403,174 | 9/1983 | Miyazaki et al. | 318/254 |
| 4,442,386 | 4/1984 | Uchida et al. | 318/254 |
| 4,449,081 | 5/1984 | Doemen | 318/254 |
| 4,472,666 | 9/1984 | Akeda et al. | 318/254 |
| 4,626,751 | 12/1986 | Doemen | 318/254 |
| 4,924,156 | 5/1990 | Muller | 318/254 |
| 4,987,352 | 1/1991 | Ishii | 318/254 |
| 5,038,083 | 8/1991 | Muller | 318/254 |
| 5,043,642 | 8/1991 | Ohi | 318/254 |

OTHER PUBLICATIONS

Michael Oppenheimer "In IC Form, Hall-Effect Devices Can Take On Many New Applications", Electronics, Aug. 2, 1971 pp. 46–49.
"Circuit of the Day", Components Report XII (1977) No. 4, pp. 140–142.

Primary Examiner—Bentsu Ro
Attorney, Agent, or Firm—McAulay, Fisher, Nissen, Goldberg & Kiel

[57] ABSTRACT

The negative temperature dependency of the torque ripple correction capability of a known drive circuit is offset by making the amplitude of input voltage signals applied to a m-differential amplifier of the drive circuit positively temperature-dependent to improve the overall torque ripple correction capability of the circuit so that deteriorated torque ripples at low temperature and increase in the level of reactive currents at high temperature may be effectively eliminated. Moreover, since temperature induced deformation of waveforms of electric currents to be carried to soft switching coils of the drive circuit is minimized, a too rapid switching speed at low temperature is avoided to suppress generation of electric as well as mechanical noises, while too dull waveforms of electric currents at high temperature are also eliminated.

5 Claims, 5 Drawing Sheets

BRUSHLESS MOTOR DRIVE CIRCUIT

This is a continuation of application Ser. No. 07/771,125, filed Oct. 3, 1991, now abandoned.

BACKGROUND OF THE INVENTION

1. Field of the Invention

This invention relates to a brushless motor drive circuit and, more particularly, to an improvement of the temperature dependency of the torque ripple correction capability of a brushless motor drive circuit.

2. Related Background

Figure 3:
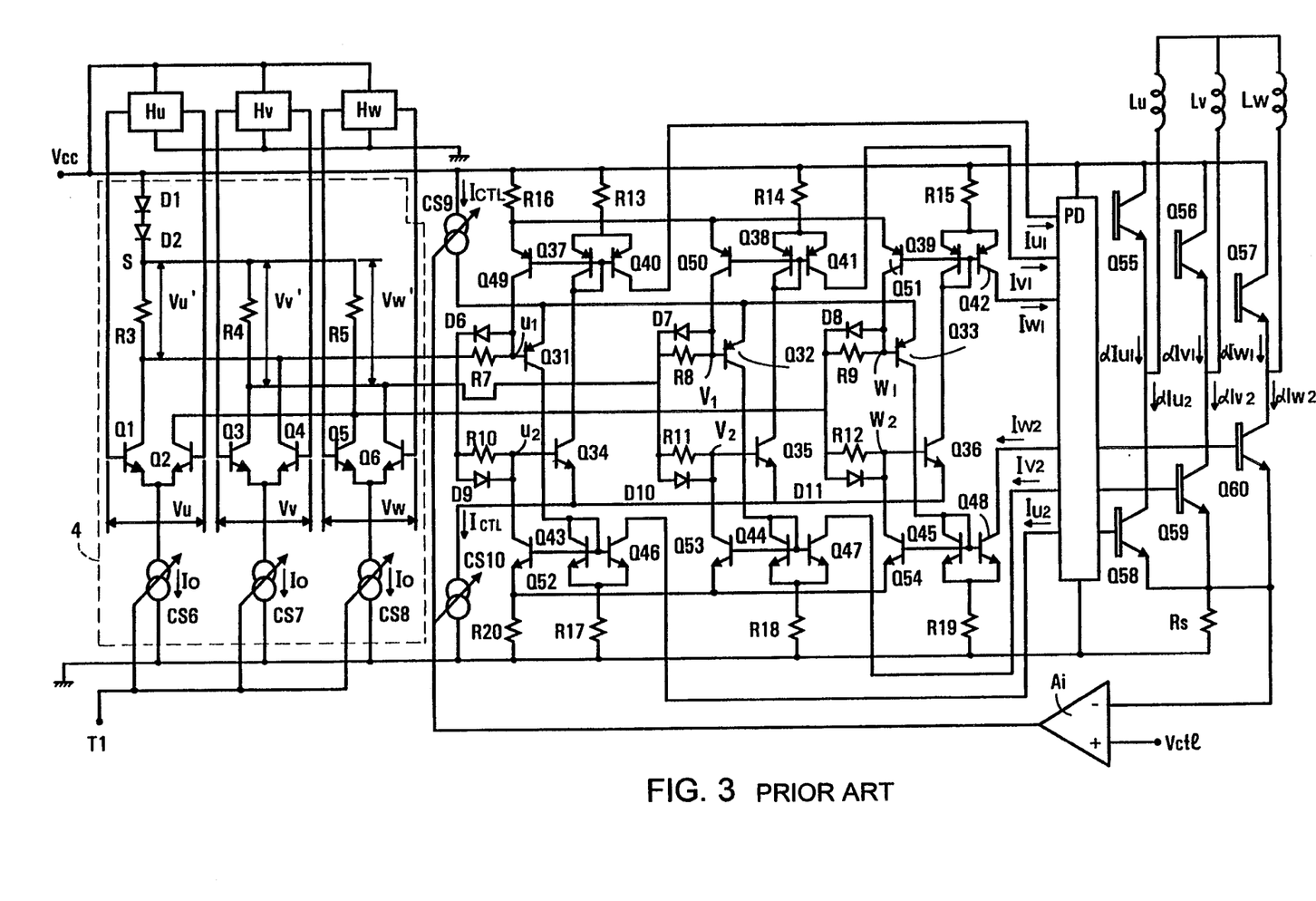
FIG. 3 is a circuit diagram of a known brushless motor drive circuit on which the present invention is based.

The inventor of the present invention has filed a patent application for a brushless motor drive circuit capable of suppressing reduction in the level of synthetic torque and at the same time having a high torque ripple correction capability. This application is U.S. patent application Ser. No. 547,798, now U.S. Pat. No. 5,173,645. FIG. 3 of the accompanying drawings diagrammatically shows a circuit according to the above cited invention.

Figure 4:
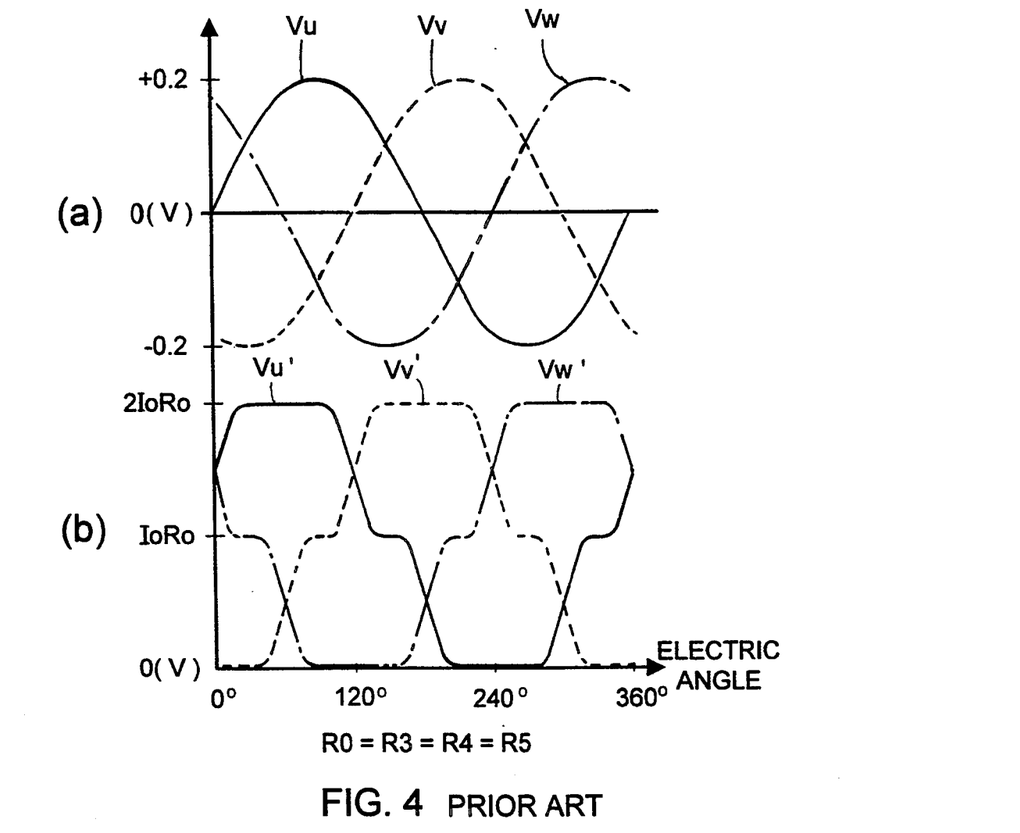
FIG. 4 is a diagrammatic illustration of the waveform of detection signals of the position detecting device of a brushless motor drive circuit as shown in FIG. 3 and that of soft switching signals.

Referring to FIG. 3, a position detecting means comprising Hall devices Hu, Hv and Hw is supplied with power from a power source Vcc. The Hall devices Hu, Hv and Hw detect the rotary position of a rotor comprising a rotor magnet (not shown) having a $2 \times n$ magnetized poles. The Hall devices selectively generate three sinusoidal wave signals Vu, Vv and Vw, whose phases are differentiated from one another by 120° as shown in FIG. 4(a), depending on the rotary position of the rotor relative to a stator. The stator comprises three drive coils Lu, Lv and Lw arranged for 3-phase configuration.

An amplifying and synthesizing circuit 44 comprises transistors Q1 through Q6, variable current sources CS6 through CS8 for generating an electric current Io, resistors R3 through R5 and diodes D1 and D2. The variable current sources CS6 through CS8 modify the input voltage applied from an adjuster terminal T1 on a variable basis to provide an electric current Io. The amplifying and synthesizing circuit 44 amplifies the output signals Vu, Vv and Vw of the Hall devices Hu, Hv and Hw and logarithmically compresses them so that the signals have their respective waveforms reduced flat at and near the inflection points. The signals, thus, become somewhat rectangular, pulse-like signals and are synthesized to produce three phase-differentiated soft switching signals Vu', Vv' and Vw' having a waveform as shown in FIG. 4(b). Differently stated, the output signals Vu, Vv and Vw of the Hall devices Hu, Hv, Hw are simplified by the transistors Q1 through Q6 and the collector outputs of the transistors Q1 through Q4 are synthesized to become a soft switching signal Vu' while the collector outputs of the transistors Q3 through Q6 are synthetically processed to produce a soft switching signal Vv' and those of the transistors Q2 and Q5 are synthesized into another soft switching signal Vw'.

The soft switching signals Vu', Vv' and Vw' from the amplifying and synthesizing circuit 44 then pass through respective resistors R7 through R12 and are converted into electric currents by a 3-differential amplifier comprising PNP-type transistors Q31 through Q33, NPN-type transistors Q34 through Q36 and variable current sources CS9 and CS10. The electric currents are amplified by the same 3-differential amplifier. The output currents Iu1, Iv1 and Iw1 as well as Iu2, Iv2 and Iw2 of the 3-differential amplifier are applied to a predriver PD by way of a mirror circuit comprising transistors Q37 through Q42 and Q43 through Q48. Then, for example, at phase U, the soft switching signal Vu' from the amplifying and synthesizing circuit 44 passes through the resistors R7 and R10 and is converted to electric currents by the transistors Q31 and Q34, which amplify the currents, the output current of the collector of the transistor Q31 being fed back to the base (point U2) of the transistor Q34 by a mirror circuit constituted by transistors Q43 and Q52 and resistors R17 and R20. The output current of the collector of the transistor Q34 is, on the other hand, fed back to the base (point U1) of the transistor Q34 by a mirror circuit constituted by transistors Q37 and Q49 and resistors R13 and R16. The level of the currents fed back to the bases of the transistors Q34 and Q31 is held significantly lower than that of the current Io from the variable current sources CS6, CS7 and CS8.

Similarly at phases V and W, the soft switching signals Vv' and Vw' from the amplifying and synthesizing circuit 44 respectively pass through the resistors R8, R11 and R9, R12 and are converted to electric currents by the transistors Q32, Q35 and Q33, Q36, which amplify the currents. The output currents of the collectors of the transistors Q32 and Q33 are respectively fed back to the bases (points V2 and W2) of the transistors Q35 and Q36 by mirror circuits respectively constituted by transistors Q44, Q53 and Q45, Q54 and resistors R18, R19 and R20. The output currents of the collectors of the transistors Q35, Q36 are, on the other hand, fed back to the bases (points V1 and W1) of the transistors Q32 and Q33 by mirror circuits respectively constituted by transistors Q38, Q50 and Q39, Q51 and resistors R14, R15 and R16. The level of the currents fed back to the bases of the transistors Q32, Q33, Q35 and Q36 is held significantly lower than that of the current Io from the variable current sources CS6, CS7 and CS8.

Figure 5:
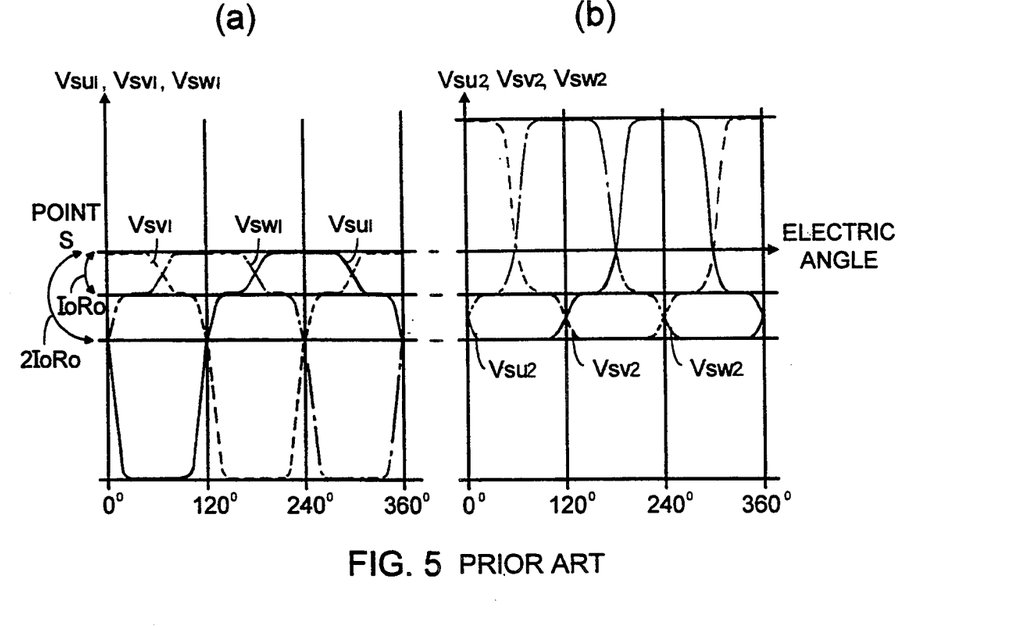
FIG. 5 is a diagrammatic illustration of the waveform of input signals for the three-differential amplifier of the known brushless motor drive circuit as shown in FIG. 3.

With an arrangement as described above, voltages Vsu1, Vsv1 and Vsw1 respectively between the cathode s of the diode D2 and the points u2, v2 and w2 and voltages Vsu2, Vsv2 and Vsw2 respectively between the cathode s of the diode s and the points u1, v2 and w2 as shown in FIG. 5. The combined diodes D6 and D9, D7 and D10 and D8 and D11 operate as amplitude limiters for limiting the amplitudes of voltages Vsu1, Vsv1, Vsw1, Vsu2, Vsv2 and Vsw2.

Upon receiving an output signal from the predriver PD, a group of transistors Q55, Q56 and Q57 operates to cause source currents $\alpha Iu1$, $\alpha Iv1$ and $\alpha Iw1$ to flow into the respective drive coils Lu, Lv and Lw. Another group of transistors Q58, Q59 and Q60 operates to cause sink currents $\alpha Iu2$, $\alpha Iv2$ and $\alpha Iw2$ to flow out of the respective drive coils Lu, Lv and Lw. Source currents $\alpha Iu1$, $eIv1$ and $\alpha Iw1$ are obtained by multiplying by $\alpha$ the respective input currents Iu1, Iv1 and Iw1 of the predriver PD by means of predriver PD and the group of transistors Q55, Q56 and Q57. Sink currents $\alpha Iu2$, $\alpha Iv2$ and $\alpha Iw2$ are obtained by multiplying, by $\alpha$ the respective input, currents Iu2, Ic2 and Iw2 of the predriver PD by means of predriver PD and the group of transistors Q58, Q59 and Q60.

Electric current detecting resistor Rs detects any electric currents flowing through the drive coil Lu, Lv and Lw and converts them to voltages. A voltage developed from resistor Rs is compared with a motor speed control signal Vctl at an electric current feedback amplifier Ai and an error voltage representing the difference, if any, between them is utilized to modify the variable current sources CS9 and CS10 and to control the electric currents Ictl coming from them. Thus, the current ICtl is so controlled that the current flowing through the resistor Rs is kept constant so long as the control signal Vctl is kept constant and a constant electric current is supplied to the drive coils Lu, Lv and Lw.

Figure 6:
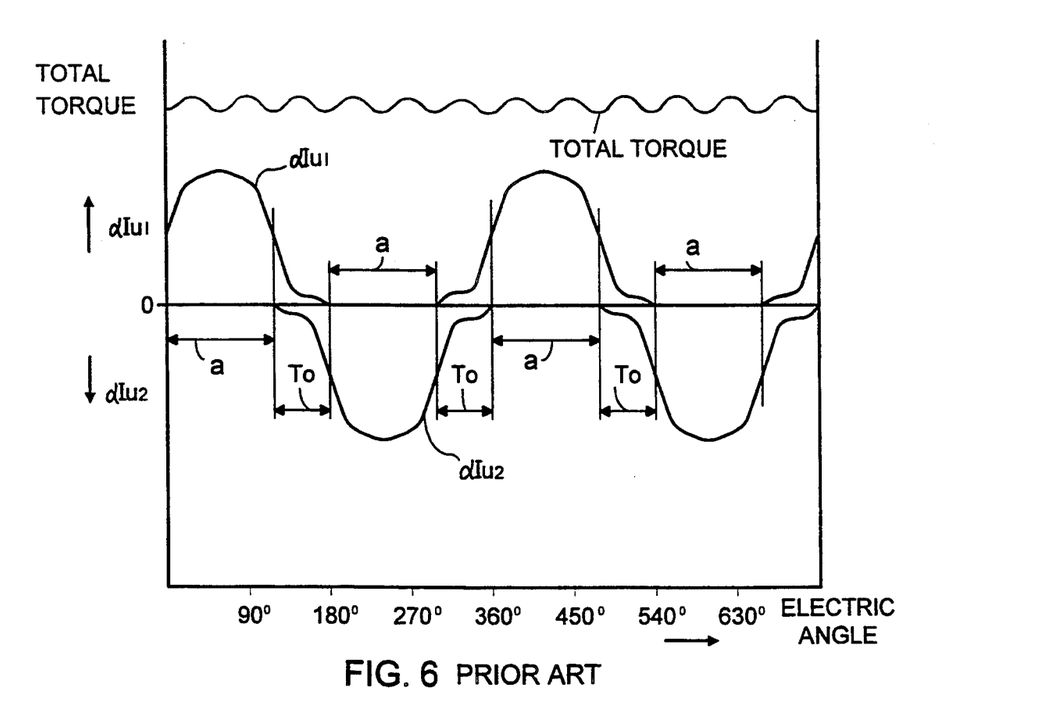
FIG. 6 is a diagrammatic illustration of the waveforms of drive coil currents and synthesized torque currents.

FIG. 6 schematically illustrates the waveforms of the source current αIu1 and the sink current αIu2 for the U-phase drive coil Lu determined by a simulating operation. It is to be noted that the source current αIu1 and the sink current αIu2 flow through the current detecting resistor as reactive currents during current conductive periods To when no current flows through the U-phase drive coil Lu as the U-phase transistors Q55 and Q58 are on simultaneously; in contrast, they are never on simultaneously during current conductive periods a when a current flows through the U-phase drive coil Lu. A similar statement applies to V- and W-phases. The level of torque ripple of a brushless motor drive circuit having a configuration as described above is approximately 6% when determined by simulating drive currents for the drive coils Lu, Lv and Lw and other factors. A remarkable improvement is, therefore, achieved by such a drive circuit.

PROBLEMS TO BE SOLVED BY THE INVENTION

As described above, a brushless motor drive circuit according to a previous invention of the inventor of the present invention and having a configuration as shown in FIG. 3 has a remarkable torque ripple reducing effect.

Figure 7:
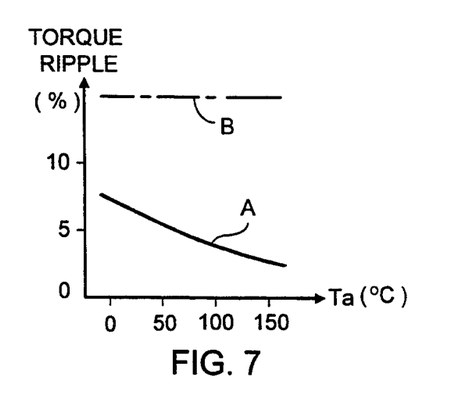
FIG. 7 is a graphic illustration of temperature dependency of the m-differential amplifier of a brushless motor drive circuit according to the invention.

On the other hand, however, the torque ripple correcting performance of its two 3-differential amplifiers respectively comprising transistors Q31, Q32, Q33 and Q34, Q35, Q36 is highly temperature-dependent, making the overall torque ripple correction capability of such a drive circuit also temperature-dependent. Solid line A in FIG. 7 illustrates the temperature dependency of the torque ripple correction capability of a drive circuit according to the above cited invention, whereas broken line B shows the torque ripple correcting performance of the drive circuit when its torque ripple correcting function is not activated. As indicated by the broken line B, the torque ripple correction capability of the drive circuit is not temperature-dependent if the torque ripple correcting function is not activated, it becomes decreasingly capable of correcting torque ripples as temperature rises.

The waveforms of electric currents carried to the soft switching coils of such a drive circuit are also temperature-dependent and the current switching speed of the coils varies with temperature. More specifically, the rising and falling edges of the current waves are so sharp at low temperature as to make the current switching speed too fast, whereas they are very dull and the motor efficiency is undesirably reduced at high temperature.

It is therefore an object of the present invention to resolve the above mentioned problems of the prior approach and to provide a brushless motor drive circuit having an improved and less temperature-dependent torque ripple correction capability that can effectively eliminate aggravation of torque ripple level at low temperature and prevent rise of reactive current level. This results in having waveforms of electric currents carried to the soft switching coils of the drive circuit which are less temperature-dependent and which do not exhibit such sharp rising and falling edges that cause the switching speed to be too high at low temperature and such dull edges that cause the switching speed to be inefficient at high temperature.

SUMMARY OF THE INVENTION

According to a first aspect of the invention, the above object of the present invention is achieved by providing a brushless motor drive circuit comprising a stator having m drive coils for m-phases, a rotor having a plurality of poles, a position detecting device for detecting the rotary position of the rotor, an m-differential amplifier for receiving signals from the position detecting device and synthesizing waveforms for electric currents to be carried to the coils and a plurality of transistors for receiving the outputs of the m-differential amplifier and selectively allowing a current to be carried to a specific drive coil, the amplitude of input voltage signals applied to said m-differential amplifier being positively temperature-dependent.

According to a second aspect of the invention, there is provided a brushless motor drive circuit comprising a stator having m drive coils for m-phases, a rotor having a plurality of poles, a position detecting device for detecting the rotary position of the rotor, a signal amplifying and synthesizing circuit for receiving signals from the position detecting device and synthesizing them into soft switching voltage signals, a m-differential amplifier for receiving soft switching voltage signals from the signal amplifying and synthesizing circuit and synthesizing waveforms for electric currents to be carried to the coils and a plurality of transistors for receiving the outputs of the m-differential amplifier and selectively allowing a current to be carried to a specific drive coil, the amplitude of input voltage signals applied to said m-differential amplifier being positively temperature-dependent.

In a preferred embodiment of the brushless motor drive circuit according to the second aspect of the invention, a series circuit comprising elements having a feature of negatively temperature-dependent forward voltage drop and resistors is connected between a non-temperature-dependent constant voltage source and an electric current to be defined by the voltage drip and the resistance of the resistors is used as a source of bias electric current for the amplifying and synthesizing circuit.

With a brushless motor drive circuit according to the first aspect of the invention, while its torque ripple correction capability is still negatively temperature-dependent, the negative temperature dependency is offset by the positive temperature dependency of the amplitude of input voltage signals for the m-differential amplifier.

With a brushless motor drive circuit according to the second aspect of the invention, the amplitude of input voltage signals for the m-differential amplifier is made positively temperature-dependent by the positive temperature dependency of the bias current source of the amplifying and synthesizing circuit.

With a preferred embodiment of the invention as described above, the bias current source of the amplifying and synthesizing circuit shows positive temperature dependency to consequently make the amplitude of input voltage signals for the m-differential amplifier to become positively temperature-dependent.

For a better understanding of the present invention, reference is made to the following description and accompanying drawings while the scope of the invention will be pointed out in the appended claims.

DETAILED DESCRIPTION OF THE INVENTION

Figure 1:
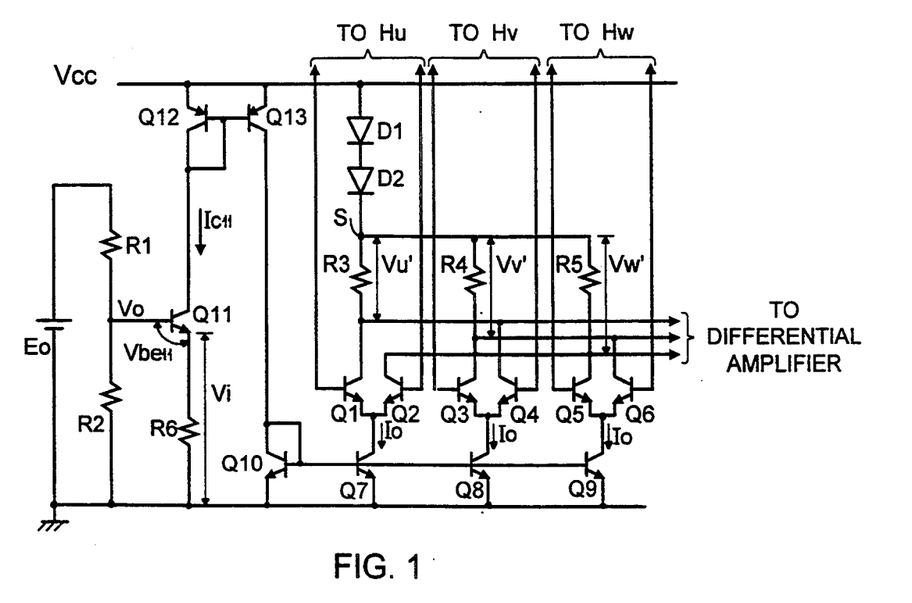
FIG. 1 is a circuit diagram of an embodiment of the brushless motor drive circuit of the invention.

Since a brushless motor drive circuit according to the present invention is primarily based on a basic circuit as illustrated in FIG. 3, to which an extra circuit section is added in FIG. 1 illustrating an embodiment of the present invention in order to make the amplitude of input voltage signals for the m-differential amplifier positively temperature-dependent, the added circuit section will be described in detail below.

In FIG. 1, the circuit section comprising diodes D1 and D2, resistors R3, R4 and R5 and transistors Q1 through Q6 has a configuration which is substantially the same as that of the amplifying and synthesizing circuit 44 of FIG. 3 except that the variable current sources CS6, CS7 and CS8 of the circuit of FIG. 3 are replaced by transistors Q7, Q8 and Q9 in the circuit of FIG. 1. These transistors Q7, Q8 and Q9 constitute a mirror circuit with a transistor Q10. As in the case of FIG. 3, each of the bases of transistors Q1 and Q2 is connected to both terminals of a Hall device Hu that operates as a position detecting device. Similarly, each of the bases of transistors Q3 and Q4 is connected to both terminals of another Hall device Hv, while each of the bases of transistors Q5 and Q6 is connected to both terminals of still another Hall device Hw. A soft switching voltage signal Vu' obtained by synthesizing collector outputs of the transistors Q1 and Q2, a soft switching voltage signal Vv' obtained by synthesizing collector outputs of the transistors Q3 and Q4 and a soft switching voltage signal Vw' obtained by synthesizing collector outputs of the transistors Q5 and Q6 are supplied to a 3-differential amplifier.

Transistor Q10 is serially connected with a transistor Q13, which transistor Q13 constitutes a mirror circuit with a transistor Q12. In FIG. 1, Eo denotes a non-temperature-dependent constant voltage source and a series circuit comprising resistors R1 and R2 is connected between the constant voltage source Eo and the ground and another series circuit constituted by the base emitter of a transistor Q11 and a resistor R6 is connected to the junction point of resistors R1 and R2. The forward voltage drop between the base and the emitter of the transistor Q11 is negatively temperature-dependent. The collector of the transistor Q11 is connected to the collector of the transistor Q12, which is serially connected to the transistor Q11.

The embodiment of the present invention having a configuration as described above operates in the following manner. The voltage from the constant voltage source Eo is divided by the resistors R1 and R2 and the voltage of the resistor R2 is applied to the base of the transistor Q11. The collector current of the transistor Q11 is determined by the resistance of the resistor R6 which is connected to the emitter of transistor Q11. The collector current of transistor Q11 is amplified or multiplied by an appropriate multiplier by means of a pair of current mirror circuits, one comprising the transistors Q12 and Q13 and the other comprising the transistors Q10, Q7, Q8 and Q9 to become a bias current Io for a 3-phase amplifying circuit comprising transistor pairs Q1 and Q2, Q3 and Q4 and Q5 and Q6 (hereinafter referred to as "Hall amplifier"). The bias current Io is expressed by the following formula $$Io \alpha Ic11 = \frac{\frac{R2}{R1+R2} Eo - Vbe11}{R6} \quad (4\text{-}1)$$

where, Ic11 is the collector current of the transistor Q11, Vbe11 is the voltage between the base and the emitter of the transistor Q11.

Generally speaking, since the voltage between the base and the emitter of a transistor is negatively temperature-dependent (approximately $-2$ mV/C.°), the above bias current Io is positively temperature-dependent if the temperature dependency of the resistors is neglected.

Since the Hall amplifier comprising the transistors Q1 through Q6 constantly receives signals from the Hall devices Hu, Hv and Hw so that the amplifier is constantly saturated with signals, the amplitude of the output of the Hall amplifier is perfectly proportional to that of the above cited electric current Io and consequently soft switching voltage signals Vu', Vv' and Vw' having an amplitude which is proportional to that of the electric current Io and phases differentiated by 120° from one another are generated respectively across both ends of the resistors R3, R4 and R5.

Thus, the 120° phase differentiated soft switching voltage signals Vu', Vv' and Vw' have a temperature dependency which is proportional to the bias electric current Io and therefore offsets the negative temperature dependency of the output/input gain of the 3-differential amplifier as the signals are supplied to the 3-differential amplifier.

When the temperature dependency of the related resistors is not negligible, it may be minimized by making the temperature-dependent characteristics of the resistor R1 as close to those of R2 as possible and equalizing those of R3 through R6. In this respect, the use of ICs is recommended because the temperature-dependent characteristics as well as other characteristics of resistors are standardized in ICs.

It may be clear by now that, in the above embodiment, since the performance of the amplifying and synthesizing circuit for forming soft switching voltage signals from output signals of the Hall devices for detecting the rotary position of the rotor is positively temperature-dependent, the amplitude of input voltage signals of the m-differential amplifier is also made positively temperature-dependent to offset the negative temperature dependency of the torque ripple correction capability of the circuit so that the overall temperature dependency of its torque ripple correction capability is improved and therefore aggravated torque ripples at low temperature and increased reactive currents at high temperature are avoided.

Additionally, because of improved 120° phase differentiated waveforms of electric currents carried to the soft switching coils, a too fast switching speed for the supply of electricity is prevented from occurring at low temperature so that generation of electric as well as mechanical noises may be effectively suppressed, while too dull waveforms of electric currents at high temperature are also eliminated. Thus, the net effect of deteriorated motor efficiency at high and low temperature ranges is eliminated.

Figure 2:
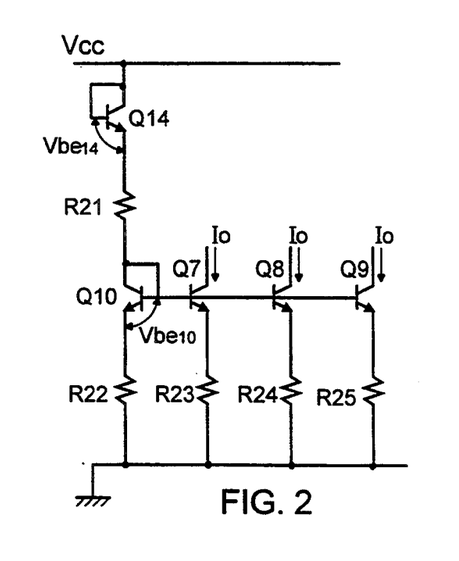
FIG. 2 is a circuit diagram of another embodiment of the invention obtained by modifying the embodiment of FIG. 1.

The bias current source for the Hall amplifier may be alternatively so configured as illustrated in FIG. 2. In this alternative configuration, a series circuit comprising a transistor Q14, a resistor R21, another transistor Q10 and another resistor R22 is inserted between a DC power source Vcc and the ground, to which transistors Q7, Q8 and Q9, that constitute a mirror circuit along with a transistor Q10, are connected. The DC power source Vcc may be a non-temperature-dependent constant voltage source.

In this alternative bias current source, if the base-emitter voltage of the transistor Q10 is Vbe10 and the base-emitter voltage of the transistor Q14 is Vbe14 and if the relationship Vbe10=Vbe14=Vbe holds true, then the Hall amplifier bias current Io will be expressed by the following formula:

$$Io = \frac{Vcc - 2Vbe}{R21 + R22} \quad (5\text{-}1)$$

Thus, as in the case of the formula (4-1) expressed earlier, the Hall amplifier bias current Io is positively temperature-dependent to effectively offset the negative temperature dependency of the 3-differential amplifier.

The means to give the amplitude of 120° phase differentiated soft switching voltages signals Vu', Vv' and Vw' a positive temperature dependency is not limited to the above described ones and it may be understood that many other alternative means are conceivable.

Figure 8:
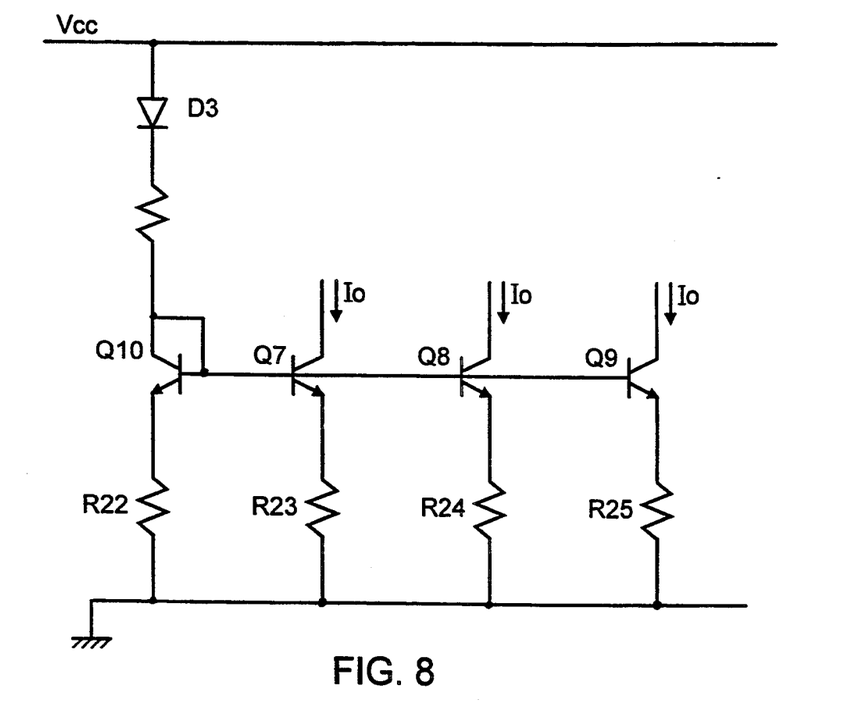
FIG. 8 is another embodiment of the invention wherein a transistor is replaced with a diode.

A transistor is used as a element which has a feature of negatively temperature-dependent forward voltage drop; it may be replaced with a diode D3 as shown in FIG. 8.

It should be noted that the negative temperature dependency needs not be 100% offset and the extent of the offsetting effect to be achieved depends on the desired level of improvement in the temperature dependency of the entire circuit.

As is apparent from the above description, since the amplitude of input voltage signals to be applied to an m-differential amplifier comprised in a brushless motor drive circuit according to the invention for receiving signals from devices for detecting rotary position of a rotor and synthesizing waveforms for electric currents to be carried to soft switching coils is made positively temperature-dependent, the negative temperature dependency of the torque ripple correction capability of the drive circuit is offset to improve the overall torque ripple correction capability of the circuit so that deteriorated torque ripples at low temperature and increase in the level of reactive currents at high temperature may be effectively eliminated.

Moreover, since temperature induced deformation of waveforms of electric currents to be carried to the soft switching coils is minimized, a too fast switching speed at low temperature is avoided to suppress generation of electric as well as mechanical noises, while too dull waveforms of electric currents at high temperature are also eliminated.

While the foregoing description and drawings represent the preferred embodiments of the present invention, it will be obvious to those skilled in the art that various changes and modifications may be made therein without departing from the true spirit and scope of the present invention.

What is claimed is:

1. In a brushless motor drive circuit comprising a stator having m drive coils for m-phases, a rotor having a plurality of poles, a position detecting device for detecting the rotary position of the rotor, an m-differential amplifier for receiving input voltage signals from the position detecting device and synthesizing waveforms for electric currents to be carried to the coils and a plurality of transistors for receiving the outputs of the m-differential amplifier and selectively allowing a current to be carried to a specific drive coil, the improvement comprising means for causing the amplitude of the input voltage signals applied to said m-differential amplifier to be positively temperature-dependent in order to reduce temperature dependence of torque ripple correction capability developed by the m-differential amplifier.

2. In a brushless motor drive circuit comprising a stator having m drive coils for m-phases, a rotor having a plurality of poles, a position detecting device for detecting the rotary position of the rotor, a signal amplifying and synthesizing circuit for receiving signals from the position detecting device and synthesizing them into soft switching voltage signals, an m-differential amplifier for receiving the soft switching voltage signals from the signal amplifying and synthesizing circuit and synthesizing waveforms for electric currents to be carried to the coils and a plurality of transistors for receiving the outputs of the m-differential amplifier and selectively allowing a current to be carried to a specific drive coil, the improvement comprising means for causing the amplitude of the soft switching voltage signals applied to said m-differential amplifier to be positively temperature-dependent in order to reduce temperature dependence of torque ripple correction capability developed by the m-differential amplifier.

3. In a brushless motor drive circuit comprising a stator having m drive coils for m-phases, a rotor having a plurality of poles, a position detecting device for detecting the rotary position of the rotor, a signal amplifying and synthesizing circuit for receiving signals from the position detecting device and synthesizing them into soft switching voltage signals, an m-differential amplifier for receiving the soft switching voltage signals from the signal amplifying and synthesizing circuit and synthesizing waveforms for electric currents to be carried to the coils and a plurality of transistors for receiving the outputs of the m-differential amplifier and selectively allowing a current to be carried to a specific drive coil, the improvement comprising means for causing the amplitude of the soft switching voltage signals applied to said m-differential amplifier to be positively temperature-dependent, wherein said causing means includes a series circuit comprising at least one element having a feature of negatively temperature-dependent forward voltage drop and resistors, which series circuit is connected between a non-temperature-dependent constant voltage source and an electric current defined by the voltage drop and the resistance of the resistors, said series circuit providing a source of bias electric current for the signal amplifying and synthesizing circuit.

4. A brushless motor drive circuit as claimed in claim 3, wherein said at least one element includes a transistor.

5. A brushless motor drive circuit as claimed in claim 3, wherein said at least one element includes a diode.

* * * * *